March 8, 1966   R. E. MIERENDORF ETAL   3,239,742
FULL WAVE, PLURAL CONDITION D.C. MOTOR CONTROL SYSTEM
Filed April 2, 1963
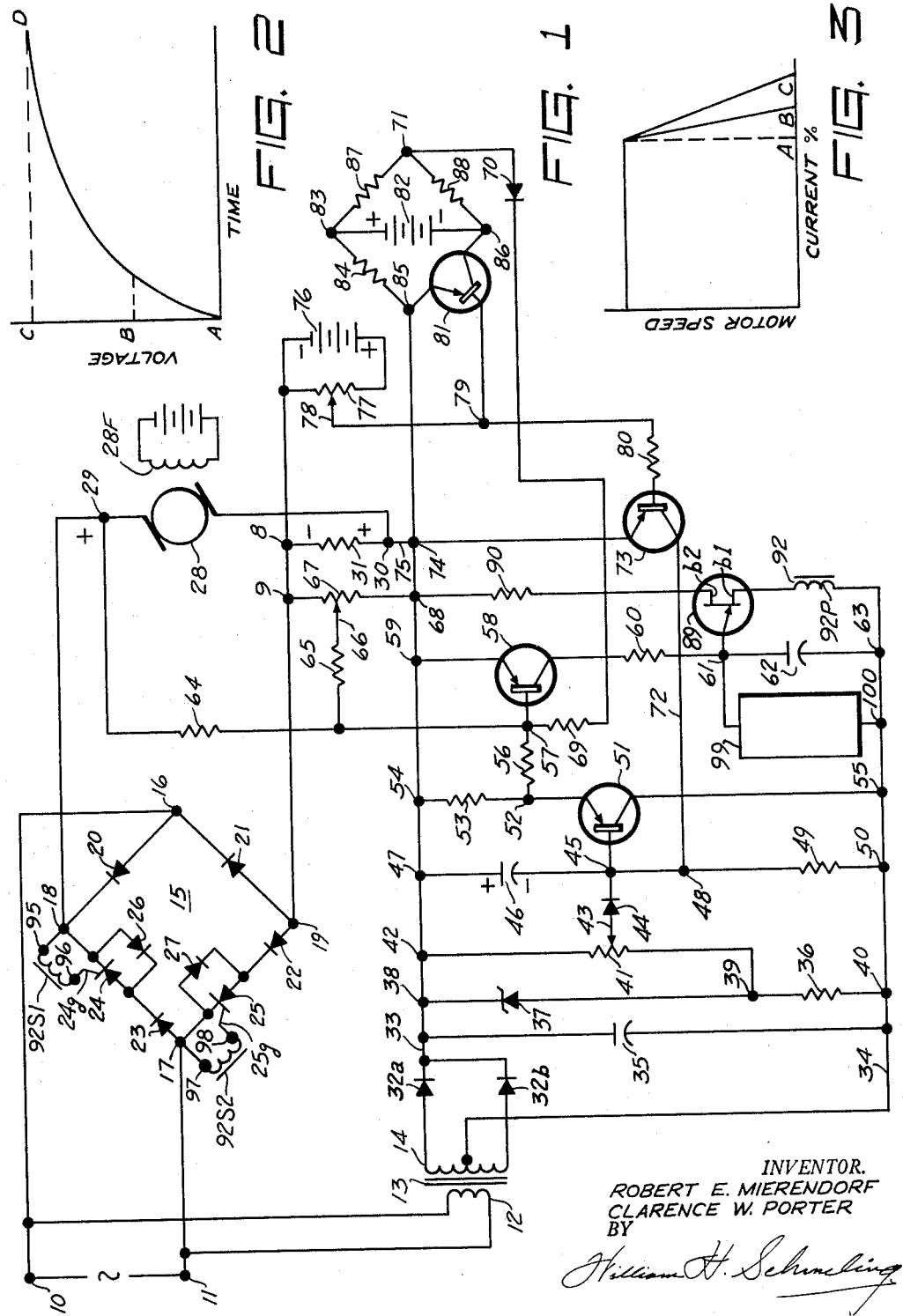
INVENTOR.
ROBERT E. MIERENDORF
CLARENCE W. PORTER
BY
William H. Schmeling

United States Patent Office 3,239,742
Patented Mar. 8, 1966

3,239,742
FULL WAVE, PLURAL CONDITION D.C. MOTOR CONTROL SYSTEM
Robert E. Mierendorf, Milwaukee, and Clarence W. Porter, Glendale, Wis., assignors to Square D Company, Park Ridge, Ill., a corporation of Michigan
Filed Apr. 2, 1963, Ser. No. 269,921
4 Claims. (Cl. 318—331)

This invention relates to control systems for electric motors and is more particularly concerned with a system for controlling the speed and torque of a direct current motor.

It is an object of the present invention to provide a control system for a direct current motor which utilizes static components and wherein a uniform acceleration of the motor is accomplished with simple electronic components.

It is a further object of the present invention to provide a control system for a direct current motor which utilizes static components wherein a single electronic switch is controlled by signal sources which include a reference signal, a feedback signal from the motor representative of motor armature voltage, a signal representative of motor load and a signal which limits the energization of the motor.

It is another object of the present invention to provide a control system for a direct current motor which is energized from an alternating current source through rectifying means which includes silicon controlled rectifiers which circuit includes a means for preventing damage to the rectifiers during periods when the rectifiers are subjected to inverse voltages from the supply.

A further object of the present invention is to provide a control system for a direct current motor wherein the armature current through the motor is limited by two separate means which operate independently in response to the same signal to provide a more positive current limiting effect.

Further objects and features of the invention will be readily apparent to those skilled in the art from the specification and appended drawing illustrating certain preferred embodiments in which:

FIG. 1 is a schematic drawing of a motor control system incorporating the features of the present invention.

FIGS. 2 and 3 are curves respectively showing the charging characteristics of a capacitor used in the circuit in FIG. 1 and the effect of the current limiting means used in the circuit in FIG. 1.

In FIG. 1 of the drawings a suitable source of alternating current is connected to a pair of terminals 10 and 11. The terminals 10 and 11 are connected to supply a primary winding 12 of a transformer 13 which has a secondary winding 14 and a full wave controlled rectifier bridge indicated by the numeral 15. The bridge 15 has a pair of input terminals 16 and 17 connected to the terminals 10 and 11 respectively, and a pair of output terminals 18 and 19. The terminal 16 is connected to the terminal 18 by a first leg of the bridge 15 which includes a diode 20 poled to conduct current from the terminal 16 to terminal 18 and to block current flow in the reverse direction. Similarly, a diode 21 in a second leg of the bridge 15 is connected to conduct current from the terminal 19 to the terminal 16, a diode 22 in a third leg of the bridge 15 is connected to conduct current from terminal 19 to the terminal 17 and a diode 23 in the fourth leg of the rectifier bridge 15 is connected to conduct current from the terminal 17 to the terminal 18.

A unidirectional conducting device in the fourth leg of the bridge 15 is illustrated as a silicon controlled rectifier 24 and has a cathode connected to the terminal 18 and an anode connected to the diode 23. The rectifier 24 is poled to conduct current in the same direction as the diode 23. The rectifier 24 also has a control or gate electrode 24g. Similarly, a second unidirectional conducting device in the third leg of the bridge 15 is illustrated as a silicon controlled rectifier 25 and has a cathode connected to the terminal 17 and an anode connected to the diode 22. The rectifier 25 is thus poled to conduct current in the same direction as the diode 22. The rectifier 25 also has a control or gate electrode 25g.

The bridge 15 also includes a pair of diodes 26 and 27. The diode 26 is connected between the cathode and anode of the rectifier 24 and poled to conduct current from the cathode to the anode of the rectifier 24. Similarly, the diode 27 is connected between the cathode and anode of the rectifier 25 and is poled to conduct current from the cathode to the anode of the rectifier 25. The diodes 26 and 27 when connected as described prevent any high inverse voltages present at the bridge 15 from damaging the silicon controlled rectifiers 24 and 25. For example, during the intervals when the terminal 18 is positive relative to the terminal 17, the diode 26 which is poled to conduct current from the terminal 18 to the terminal 17, prevents any material potential from being impressed across the cathode to the anode of the rectifier 24. During this interval the diode 23 blocks current flow from the terminal 18 to the terminal 17 and has substantially the full voltage between the terminals 18 and 17 impressed across its terminals. Similarly, the diode 27 prevents an inverse voltage from being impressed across the rectifier 25 by providing a path for current flow from the terminal 17 to the terminal 19 so that substantially the full voltage between the terminal 17 and the terminal 19 is impressed across the diode 22 when the terminal 17 is positive relative to the terminal 19.

A motor 28 has an armature winding connected across a pair of input terminals 29 and 30. The input terminal 29 is connected directly to the output terminal 18 of the bridge 15. The input terminal 30 is connected through a resistor 31, a junction 8 and a junction 9 to the output terminal 19 of bridge 15. It will be seen that the bridge 15 will supply the armature of the motor 28 with full wave rectified current with the terminal 29 positive relative to the terminal 30.

The secondary winding 14 of the transformer 13 is center tapped and connected through a pair of diodes 32a and 32b to supply a pair of leads 33 and 34 with full wave rectified current filtered by a capacitor 35. The diodes 32a and 32b are poled to cause the lead 33 to be positive with respect to the lead 34. A diode 37 is connected between a junction 38 in the lead 33 and a junction 39 which is connected through the resistor 36 to a junction 40 in the lead 34. The diode 37 and the resistor 36 are arranged so that the potential between junctions 38 and 39 is maintained at a constant reduced value with respect to the voltage between the leads 33 and 34. A potentiometer resistor 41 is connected in parallel with the diode 37 between a junction 42 in the lead 33 and the junction 39. The potentiometer 41 has a slider 43 connected through a diode 44 to a junction 45. The diode 44 is poled to conduct current from the slider 43 to the junction 45 and to block current flow in the reverse direction. A capacitor 46 is connected between the junction 45 and a junction 47 in the lead 33. The junction 45 is connected through a junction 48 and a resistor 49 to a junction 50 in the lead 34. The junction 45 is also connected to a base electrode of a transistor 51. The transistor 51 has an emitter connected through a junction 52 and a resistor 53 to a junction 54 in the lead 33 and has a collector connected to the lead 34 at a junction 55. The junction 52 is connected through a resistor 56 to a junction 57, which in turn is connected to a base of a transistor 58. The transistor 58 has an emitter connected to the lead 33 at a junction 59 and a collector connected through a resistor 60, a junction 61, and a capacitor 62 to the lead 34 at a junction 63. The junction 57 is connected through a resistor 64 to the positive terminal 29 of the motor 28. The junction 57 is also connected through a resistor 65 to a slider 66 of a potentiometer resistor 67 which is connected between the junction 39 and a junction 68 in the lead 33. The junction 57 further is connected through a resistor 69 and a diode 70 to a junction 71. The junction 48 is connected through a conductor 72 to a collector electrode of a transistor 73 which has an emitter connected to a junction 74 in the lead 33. A conductor 75 connects the junction 74 to the negative terminal 30 of the motor 28.

A suitable source of direct current, indicated as a battery 76, is arranged to apply a potential across a potentiometer resistor 77. The negative terminal of the battery 76 is connected to the junction 8. The potentiometer 77 has a slider 78 connected to a junction 79 which is in turn connected through a suitable resistor 80 to a base of the transistor 73. The junction 79 is also connected to a base of a transistor 81. Another source of direct current, such as a battery 82, has its positive terminal connected through a junction 83 and a resistor 84 to a junction 85 which is connected to an emitter of the transistor 81. The negative terminal of the battery 82 is connected through a junction 86 to a collector of the transistor 81. The junction 71 is connected to the junction 83 through a resistor 87 and to the junction 86 through a resistor 88.

The junction 61 is connected to an emitter electrode of a unijunction transistor 89 which has a pair of base electrodes designated as $b1$ and $b2$. The $b2$ electrode of the unijunction transistor 89 is connected through a resistor 90 to the junction 68, and the base $b1$ electrode is connected through a primary winding 92P of a transformer 92 to the lead 34. The transformer 92 has a pair of secondary windings 92S1 and 92S2. The secondary winding 92S1 has a pair of terminals 95 and 96 and the secondary winding 92S2 has a pair of terminals 97 and 98. The terminal 95 is connected to the cathode of the rectifier 24 at the junction 18 and the terminal 96 is connected to the gate electrode 24g. Similarly, the terminal 97 is connected to the cathode of the rectifier 25 at the input terminals 17 and the terminal 98 is connected to the gate 25g. The junction 61 is also connected through a suitable synchronizing circuit 99 to a junction 100 in the lead 34.

In view of the preceding description, the operation of the circuit shown in FIG. 1 will now be described. The source of alternating current connected to the terminals 10 and 11 supplies alternating current to the input terminals 16 and 17. During the half cycles of the voltage wave of the source when the terminal 10 is positive, current flows in a circuit which includes the terminal 10, the input terminal 16, the diode 20 in the first leg of the bridge 15, the ouput terminal 18, the terminal 29, the armature winding of motor 28, the junction 30, the resistor 31, the junction 8 and the junction 9 to the terminal 19 of the bridge 15. The current then flows through the second leg of the bridge 15 which includes the diode 22 and the controlled rectifier 25 to the terminal 17 and thence to the terminal 11. During the half cycles of the source when the terminal 11 is positive, current flows in a circuit which includes the terminal 17, the diode 23 and the controlled rectifier 24 in the third leg of bridge 15, to the terminal 18, the terminal 29 and the armature winding of the motor 28, the terminal 30, the resistor 31, the junction 8, the junction 9, the terminal 19, the diode 21 in the fourth leg of the bridge 15 and the terminal 16 to the source at the terminal 10.

It will be seen that the bridge 15 causes the armature of the motor 28 to be supplied with rectified direct current with the terminal 29 positive relative to terminal 30 and that during each alternate half cycle the current flows from the anode to cathode of one of the controlled rectifiers 24 or 25.

It is well known that a silicon controlled rectifier is a static switch which within limits, will bock the flow of current from its anode to its cathode during periods when its anode is positive. However, if the gate electrode is provided with a voltage pulse which is positive relative to its cathode during the interval when the anode of a silicon controlled rectifier is positive, the rectifier will switch from its blocking or nonconductive state to a conductive state and pass current with a very low impedance between its anode and its cathode during the remainder of the half cycle of positive polarity of its anode. The firing circuit which will be hereinafter described controls the instant during each half cycle of the alternating current source at which the respective gate electrodes 24g and 25g of the rectifiers 24 and 25 receive a pulse of current which will cause the rectifiers 24 and 25 to become conductive. Thus, as is well known, if the rectifiers 24 and 25 are caused to become conductive at the beginning of each half cycle of the alternating current supply when the voltage of the source exceeds the back E.M.F. of the motor 28, the motor 28 will receive a maximum voltage. As the rectifiers 24 and 25 are switched to their conductive states progressively later in each half cycle of the alternating current source, the voltage at the motor 28 will become progressively smaller during each half cycle of the alternating current source.

The transformer secondary winding 14, the diodes 32a and 32b, the capacitor 35, the resistor 36 and the voltage regulating diode 37 are arranged to supply a constant direct current voltage between the junctions 38 and 39. An adjustable portion of the voltage between the junctions 38 and 39 appearing between the junction 42 and the slider 43 is hereinafter called the reference voltage and is used to control the speed of the motor 28. It will be seen that as the slider 43 is moved toward the junction 42, the reference voltage decreases and a movement of the slider 43 toward the junction 39 increases the reference voltage.

The capacitor 46 is provided with a charging path between the leads 33 and 34 which includes the junction 47, the capacitor 46, the junction 45, the junction 48, the resistor 49 and the junction 50. The polarity of the leads 33 and 34 is such that the junction 47 side of the capacitor is positive relative to the junction 45 side. The junction 45 is connected to the slider 43 through the diode 44 which is arranged to block current flow from the junction 45 to the slider 43 and to conduct current in the opposite direction. When the slider 43 is repositioned and moved toward the junction 42 so that the potential of the slider 43 becomes more positive, the capacitor 46 principally discharges through a circuit which includes the junction 47, the junction 42, the portion of the resistor 41 between the junction 42 and the slider 43 and the diode 44 and the junction 45 or through a path through diode 37 until the charge on the capacitor 46 is equal to the potential difference between the junction 42 and the slider 43. Similarly, when the slider 43 is repositioned and moved toward the junction 39 so that the potential at the slider 43 becomes more negative, the capacitor 46 will charge to a higher potential through the resistor 49 until the potential at the junction 45 equals the potential of the slider 43. Thus, during steady state conditions, the potential at the junction 45 equals the potential at the slider 43, and any change in the position of the slider 43 toward junction 39 causes a substantially linear rate of increase in potential of the capacitor 46 as is shown in FIG. 2. The substantially linear rate of increase in the potential across the capacitor 46 results from the fact that the capacitor 46 charges toward the voltage of the source which is greater than the reference voltage which controls the extent of charging of the capacitor 46. It will be seen in FIG. 1 that the potential available to charge the capacitor 46 is the potential between the leads 33 and 34 at the junctions 47 and 50 as represented by ordinate A–C in FIG. 2. Thus if the capacitor 46 were to be changed to the full supply potential, the rate of change of the charge across the capacitor 46 would follow the exponential curve A–D shown in FIG. 2, and, as the charge on the capacitor 46 approaches the supply potential, the rate of change would be small. However, when the reference potential is limited to a fraction of the supply potential as indicated by the voltage between A and B, then the rate of change of the charge across the capacitor 46 follows the substantially linear portion of the exponential curve A–D and will be at a maximum. Thus it will be seen that the diode 44 which is poled to conduct current from the slider 43 to the junction 45 acts as a clamping diode and maintains the junction 45 and the slider 43 at the same potential and any change in the position of the slider 43 will be followed by a change in potential at the junction 45.

The junction 45 is connected to the base of the transistor 51 which has its emitter connected through the junction 52 and the resistor 53 to the junction 54. The collector of the transistor 51 is tied to the lead 34 at the junction 55. The transistor 51 thus acts as an emitter follower amplifier reflecting inversely the changes in positive potential at the junction 45 by a change of current at the junction 52. The junction 52 is connected through the resistor 56 to the junction 57 which in turn is connected to three separate signal sources as will be hereinafter described.

As was previously indicated, the conduction of the transistor 51 follows the reference voltage signal at the slider 43. The current flow at the junction 52 is supplied from the lead 33 through the junction 54 and the resistor 53 and in part from the junction 59 through the emitter and base of the transistor 58 and through the resistor 56. Therefore as the conduction of the transistor 51 increases and decreases, the emitter to base current of the transistor 58 increases and decreases.

The input terminal 29 of the motor 28 has a positive polarity and is connected through the resistor 64 to the junction 57 so as to apply a signal to the junction 57 representative of the armature voltage of motor 28. It is apparent that as the junction 29 becomes more positive relative to the junction 30, because of an increase in motor speed, current will flow from the junction 29 through the resistor 64 to the junction 57 in the base circuit of transistor 58. This will bias the transistor 58 against conduction and cause a decrease in current flow through the transistor 58 because it is in opposition to the reference current flow caused by an increase in the conduction of the transistor 51. Likewise, as the load on the motor 28 is increased, the motor speed tends to be reduced to cause a decrease in voltage of the terminal 29 and a corresponding increase in the conduction of the transistor 58.

It is well known that changes in current flow through the motor armature cause a change in the voltage drop across the motor due to the resistance of the motor armature so the potential at terminal 29 no longer accurately reflects the speed of the motor. An increase in current through the armature of the motor 28 causes an increase in the potential drop across the resistor 31 and potentiometer resistor 67. When this increase in potential occurs, the slider 66 becomes more negative relative to the junction 68. The junction 68 is directly connected through the junction 59 to the emitter of the transistor 58 and the slider 66 is connected through the resistor 65 to the junction 57. Thus as the motor current increases because of a change in the load imposed upon the motor 28, an increased current will flow from the emitter to base of transistor 58 to bias the transistor 58 toward an increased conduction.

It will be seen that the polarity of the battery 76 is arranged to oppose the potential drop across the resistor 31. The slider 78 on the potentiometer 77 is adjusted to normally maintain the base of transistor 73 positive relative to the emitter of transistor 73. Thus, during normal operation, that is, when the motor 28 is operating under less than the preseleced value of maximum current, as shown in FIG. 3, the transistor 73 will be biased toward nonconduction. However, should an increased load on the motor 28 cause the armature current to exceed the selected value, then the potential across the resistor 31 will increase to a value which biases the transistor 73 to conduction. The current flow in emitter to collector of the transistor 73 and the lead 72 to the junction 48 biases the transistor 51 against conduction and reduces the current flow through the transistor 58.

The junction 79 is connected in the base circuit of the transistor 81 which has its emitter connected to the junction 85. The battery 82 has its polarity arranged to maintain the junction 85 positive relative to the junction 71 when the transistor 81 is nonconducting. However, current does not flow from the junction 85 to junction 71 because of the blocking effect of diode 70. An increase in current flow through the armature of motor 28 causes an increase in the potential drop across the resistor 31 which overcomes the bias effect of the battery 76 and causes the junction 85 to become positive relative to the base of the transistor 81, biasing the transistor 81 to conduction. When the transistor 81 conducts, the junction 85 becomes more negative relative to junction 83. However, the junction 71 remains substantially constant relative to junction 83 so that in effect, the junction 71 becomes positive relative to the junction 85 and current flows through the diode 70 and the resistor 69 to the junction 57 which biases the transistor 58 against conduction to reduce the current flow through the transistor 58.

It is apparent from FIG. 1 of the drawings that the resistors 84, 87 and 88 together with the transistor 81 and battery 82 are connected to junctions 83, 85, 86 and 71 in a bridge circuit wherein junctions 83 and 86 provide the input terminals and the junctions 85 and 71 the output terminals which are connected respectively across the emitter and base of the transistor 58 through the diode 70 and the resistor 69. Further, the resistor 80 which is interposed between the junction 79 and the base of the transistor 81 slightly delays the change to a conductive state of the transistor 73 so that the transistor 81 becomes conductive before the transistor 73 in response to a change in signal voltage at slider 78. Hence the current limiting action ocurs in a stepped fashion as shown on FIG. 3 to provide the desired sharp cut-off for an increase in armature current. Point A indicates the desired current limit and the points B and C indicate the points at which the transistors 81 and 73 become effective to limit a further increase in armature current of the motor 28.

It will be seen that the transistor 58 has its emitter and collector connected through the resistor 60 in a charging circuit for the capacitor 62. Thus as the conduction of the transistor 58 increases and decreases, the rate of change of charge on the capacitor 62 likewise increases and decreases.

The synchronizing circuit means 99 shown in FIG. 1 may be of any of the well known types disclosed in standard electronic handbooks or may be of the type as is fully disclosed in United States Patent No. 2,574,939, issued November 13, 1951 and assigned to the assignee of the present invention. Any suitable type of synchronizing circuit 99 which will provide a discharge circuit for the capacitor 62 at voltage zero during each half cycle of alternating voltage of the supply and permit the capacitor to charge after voltage zero of the supply may be used. Thus during each half cycle of the alternating current supply, the capacitor 62 charges at a rate determined by the conduction of transistor 58. As the charge on the capacitor 62 increases, the potential at the junction 61 becomes increasingly positive. When the potential at the junction 61 exceeds the intrinsic standoff ratio of the unijunction transistor 89 times the potential difference between the $b2$ and $b1$ electrodes of the unijunction transistor 89, the unijunction transistor 89 switches from a nonconductive state to a conductive state and the capacitor 62 discharges through a circuit which includes the junction 61, the emitter to the base $b1$ electrode of the transistor 89, the transformer primary winding 92P and the junction 63. The discharge current of the capacitor 62 causes the secondary windings 92S1 and 92S2 to provide sharp output voltage pulses at terminals 95–96 and 97–98. The terminals 95–96 and 97–98 are respectively connected to the cathode and gates $24g$ and $25g$ of the controlled rectifiers 24 and 25. The sharp output voltage pulses of the secondary windings 92S1 and 92S2 causes the rectifiers 24 and 25 to switch from a nonconductive to a conductive state at the instant when the pulses occur during the half cycle of the voltage wave of the alternating current source during which the anodes of the rectifiers 24 and 25 have a positive polarity relative to the cathodes. Thus as the controlled rectifiers 24 and 25 are caused to become conductive during varying instants during the half cycles of the alternating current source, the armature current of motor 28 will correspondingly vary to maintain the speed of the motor 28 at an adjusted value determined by the setting of the slider 43 on the potentiometer 41.

For purposes of clarity and brevity, a field of motor 28 is shown as a shunt field 28F which is energized by a direct current source, as a battery, and various other well known items such as a reversing circuit for the motor 28 as well as filter capacitors and resistors, current limiting and stabilizing resistors and rectified alternating current supplies instead of batteries have been omitted as the employment of these items is well known to be obvious to those skilled in the art.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. In a control system for a direct current motor, the combination comprising; an alternating current source, a full wave bridge rectifier connected between the source and motor for supplying the motor with rectified direct current, said rectifier having at least two legs with each of said legs including; a silicon controlled rectifier having an anode, a cathode and a gate electrode, a unidirectional conducting diode having a cathode connected to the anode of the silicon controlled rectifier and a second unidirectional conducting diode having an anode connected to the cathode of the silicon controlled rectifier an a cathode connected to the cathode of the first diode and the anode of the silicon controlled rectifier for protecting the silicon controlled rectifier from reverse voltages in said leg by having the reverse voltages in said leg impressed between the cathode and anode of the first mentioned diode.

2. In a control system for a direct current motor, the combination comprising; an alternating current source, a full wave bridge rectifier connected between the source and motor for supplying the motor with rectified direct current, said rectifier having at least two legs with each of said legs including: a silicon controlled rectifier for controlling current flow in said leg and a pair of unidirectional conducting diodes each having a cathode connected to a cathode electrode of the controlled rectifier for protecting the silicon controlled rectifier from inverse voltages appearing across said leg, a direct current voltage source, a capacitor connected in a charging circuit across the direct current source, a transistor having a base and an emitter connected in a parallel circuit with the capacitor, a reference signal source providing a direct current voltage signal constituting an adjustable portion of the direct current voltage source, a third unidirectional conducting diode connecting the capacitor in a circuit with the reference signal source in a direction for limiting the charging of the capacitor from the direct current voltage source to a value determined by the reference source, a signal source providing a motor armature voltage signal, a signal source providing a motor armature current signal, a second transistor, a second capacitor connected in a circuit with an emitter and a collector of the second transistor and arranged to be charged by current flow through the second transistor from said direct current voltage source, circuit means connecting a base of the second transistor to the emitter of the first transistor and also connecting the base of the second transistor to the signal sources providing the armature current signal and armature voltage signal whereby current flow through the second transistor is dependent on the signals from both of said sources and the conduction of the first transistor, a means connected to the base of the second transistor for reducing the current flow through said second transistor when the armature current exceeds a first predetermined value, a second means connected to the base of the first transistor arranged to provide a signal and reduce the current flow through the second transistor when the armature current exceeds a second predetermined value, and means including a unijunction transistor and a transformer connected to be responsive to a predetermined charge on the second capacitor for discharging the second capacitor and initiating conduction of the silicon controlled rectifiers and thereby controlling the current flow in the legs of the bridge rectifier in response to changes in the charge on the second capacitor as caused by variations in current flow through the second transistor.

3. In a control system for a direct current motor, the combination comprising: an alternating current source, a rectifier means connected between the source and motor for supplying the motor with rectified direct current, said rectifier means having at least two legs with each of said legs including; a silicon controlled rectifier having an anode, a cathode and a gate electrode, a unidirectional conducting diode having a cathode connected to the anode of the silicon controlled rectifier and a second unidirectional conducting diode having an anode connected to the cathode of the silicon controlled rectifier and a cathode connected to the cathode of the first diode and the anode of the silicon controlled rectifier for protecting the silicon controlled rectifier from reverse voltages in said leg by having the reverse voltages in said leg impressed between the cathode and anode of the first mentioned diode.

4. In a control system for a direct current motor energied from an alternating current source, a full-wave bridge rectifier for supplying the motor with rectified direct current, said rectifier having four legs defining a pair of alternating current terminals for connection to the source and a pair of direct current terminals for connection to the motor, four unidirectional conducting diodes interposed in said legs, respectively, one pair of said diodes being poled to permit half-waves of current of one polarity to flow from said source through said motor and the other pair of said diodes being poled to permit half-waves of current of the opposite polarity to flow from said source through said motor in the same direction, a pair of controlled rectifiers interposed in two of said legs, respectively, in series with, and poled in the same direction as, the respective diodes in said legs, one of said controlled rectifiers being in one of said legs containing a diode of said one pair of said diodes and the other of said controlled rectifiers being in one of said legs containing a diode of said other pair of said diodes, a pair of protective unidirectional conducting diodes connected in parallel with the controlled rectifiers, respectively, and in series with the diodes interposed in said two of said legs, respectively, each protective diode being poled oppositely with respect to its associated controlled rectifier, and means connecting the alternating current terminals to the source and connecting a winding of said motor across the direct current terminals.

References Cited by the Examiner

UNITED STATES PATENTS

| | | |
|---|---|---|
| 2,722,649 | 11/1955 | Immel et al. |
| 2,992,382 | 7/1961 | Hetzler _____ 323—22 |
| 3,024,401 | 3/1962 | Dinger _____ 318—327 |
| 3,026,463 | 3/1962 | Wolke et al. _____ 318—323 |
| 3,026,464 | 3/1962 | Greening et al. _____ 318—227 |
| 3,089,076 | 5/1963 | Lee. |
| 3,095,534 | 6/1963 | Cockrell _____ 318—331 X |
| 3,119,957 | 1/1964 | Alexanderson. |

ORIS L. RADER, *Primary Examiner.*